United States Patent Office 3,561,060
Patented Feb. 9, 1971

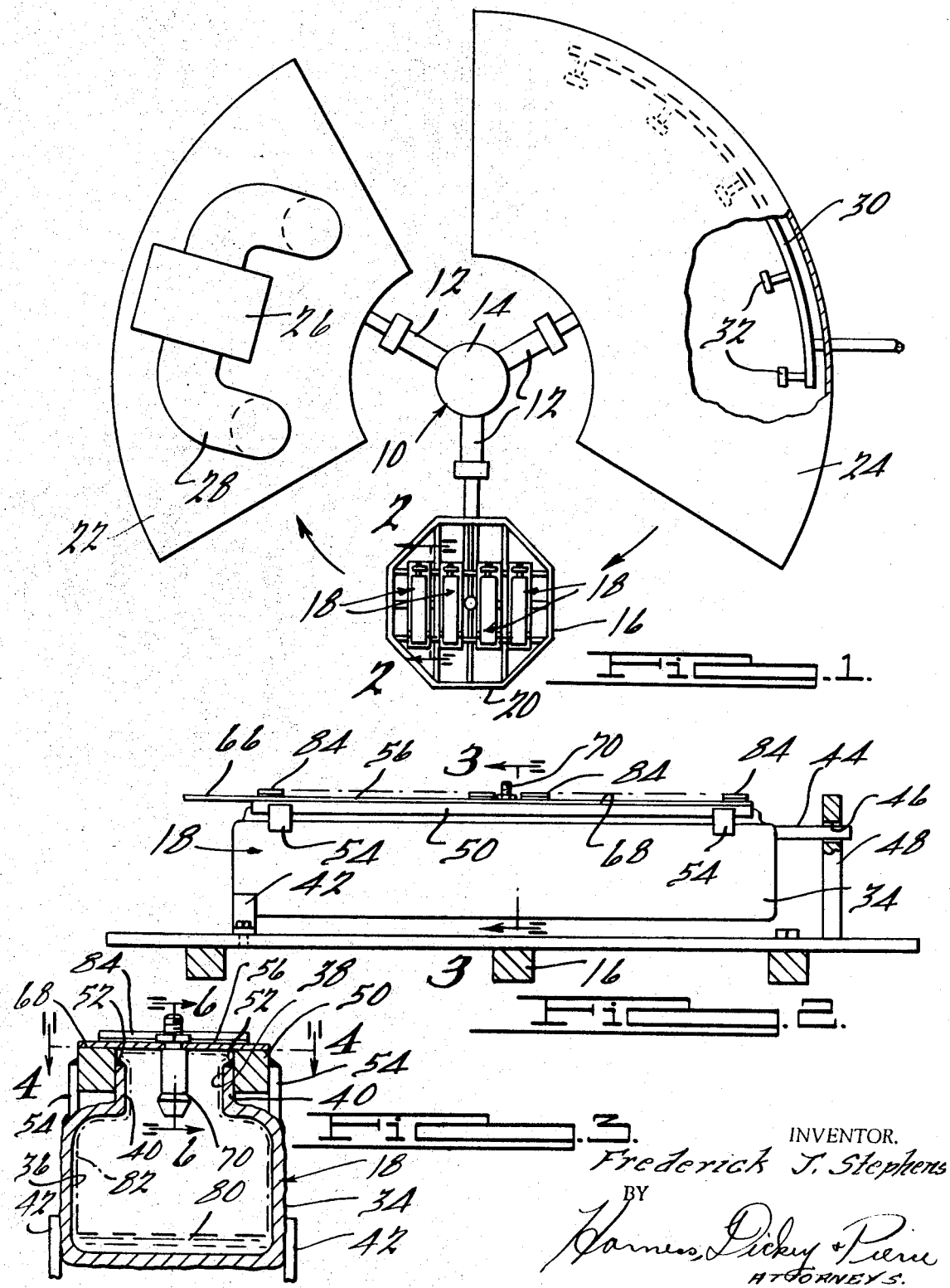

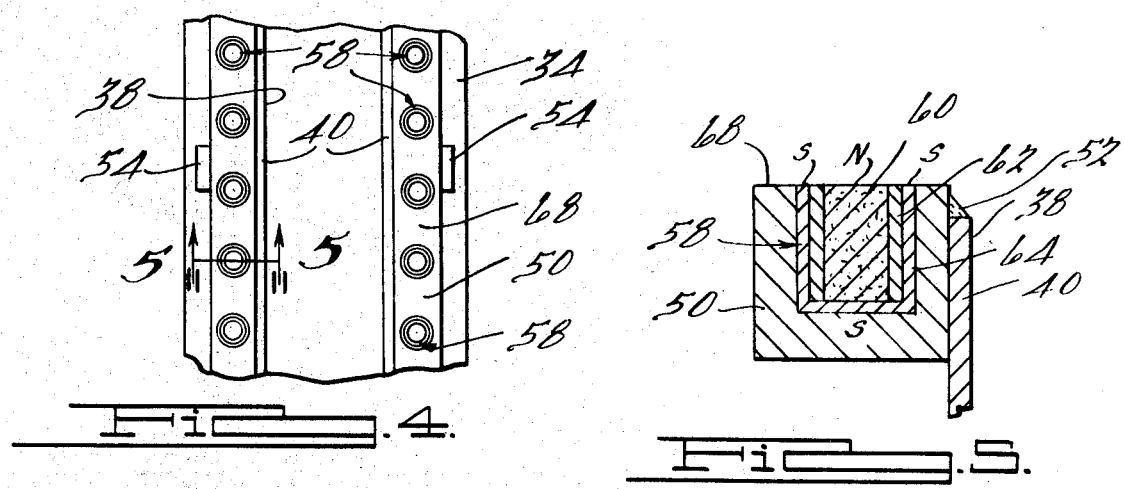
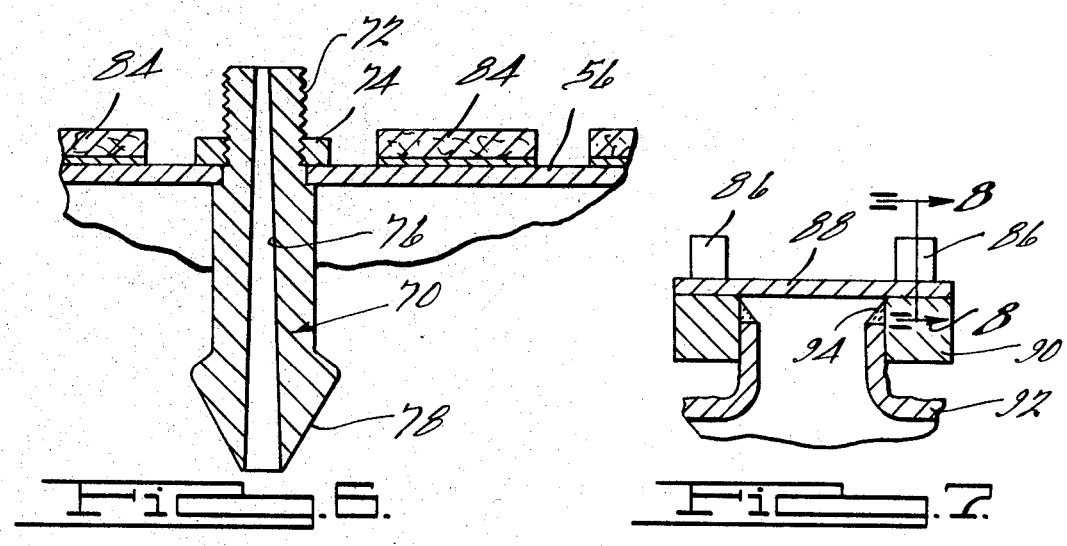
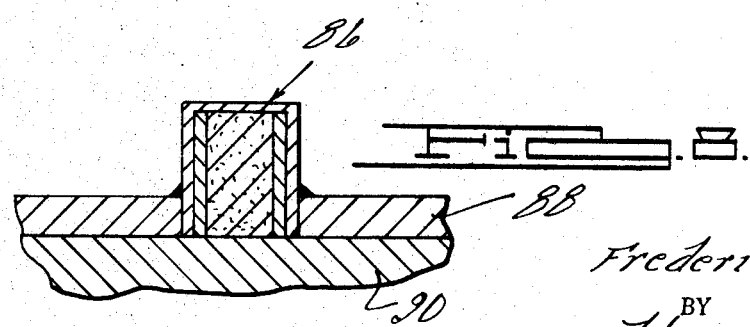

3,561,060
ROTATIONAL CASTING MOLD
Frederick J. Stephens, Warren, Mich., assignor to Allen Industries, Inc., a corporation of Delaware
Filed Mar. 8, 1968, Ser. No. 711,656
Int. Cl. B29c 5/04
U.S. Cl. 18—26    5 Claims

ABSTRACT OF THE DISCLOSURE

A method and a mold for rotationally casting hollow plastic articles formed with an opening for charging the plastic into the mold and for removing the finished article therefrom, and which opening is sealed during the casting operation by a magnetically mounted lid, which preferably additionally includes a vent therethrough and evaporative cooling means thereon.

BACKGROUND OF THE INVENTION

Rotational casting of flowable plastic materials is in commercial use for manufacturing a variety of hollow articles, such as toys, wearing apparel, furniture components, decorative trim materials and the like. The hollow articles are formed by employing a heat conductive mold formed with a cavity therein of a contour and surface texture corresponding to the exterior surface and configuration of the finished article. A premeasured quantity of a flowable plastic material, such as particulated thermoplastic resins and liquid plastisols, is charged into the cavity of a cool mold, which subsequently is closed and thereafter is heated while the mold is simultaneously rotated in a plurality of planes, effecting a progressive deposition of the plastic material on the inner surface of the mold cavity, forming a substantially uniform coating thereover. In the case of vinyl plastisols, the heating of the mold results in the formation of a gelled layer of vinyl plastic on the mold cavity surface which, upon further heating, fuses into an integral film having an exterior surface which is an exact replica of the surface of the mold cavity.

Typical apparatuses and techniques for forming hollow articles by rotational casting are disclosed in United States Pats. No. 2,629,134 and No. 2,957,202, to which reference is made for further details pertinent to the environment of the present invention. In accordance with the foregoing and other prior art techniques for rotationally casting hollow articles, the molds in which the plastic is rotationally cast are mounted on a suitable frame incorporating clamping fixtures thereon for security retaining the molds and for holding the closures or mating mold components in tightly clamped relationship to prevent any leakage of the flowable plastic from the interior thereof during the rotation of the mold. Conventionally, in the manufacture of hollow articles of average size, a plurality of molds are mounted on each frame, necessitating a relatively elaborate mold mounting fixture to assure accurate alignment between the molds and closure members in order to attain proper sealing thereof. Since in many instances the molds employed are of the electroformed type and are relatively fragile, great care must be exercised to avoid the imposition of excessive pressures against localized mold areas to avoid damage or fracture thereof. In view of the foregoing, the setup of a plurality of molds on the frame constitutes a time-consuming and costly operation to assure accurate alignment, frequently within several thousandths of an inch, of the mating clamping fixtures and to assure maintenance of this alignment in spite of the temperature cycling to which the mounting fixture and molds are subjected during processing. In spite of these precautions, leakage of the plastic and, in particular, liquid vinyl plastisols, occurs which not only constitutes a wastage of material and a fouling of the components of the rotational casting apparatus, but also results in the formtion of articles having a skin thickness of less than that desired, resulting in scrappage of some of the articles produced.

The foregoing and other disadvantages associated with the rotational casting of hollow plastic articles are overcome in accordance with the mold assembly and method comprising the present invention in which a substantial simplification is provided in the means for closing the mold to minimize leakage of plastic therefrom during simultaneous rotation of the mold in a plurality of planes prior to the solidification of the plastic and which additionally provides for a substantial simplification of the mold mounting fixture enabling quick and simple removal and substitution of molds on the apparatus, providing for a substantial increase in the flexibility and versatility of the machine.

SUMMARY OF THE INVENTION

The foregoing and other benefits and advantages of the present invention are achieved by a mold assembly for rotationally casting hollow plastic articles provided with a cavity and formed with an opening therethrough for charging the plastic material into the mold and for removing the resultant cast article therefrom, and which opening is adapted to be substantially sealed by a lid which is at least coextensive with the opening and is magnetically coupled to the mold. In accordance with the preferred embodiments of the present invention, the lid is further provided with a vent therethrough for releasing any pressure buildup within the interior of the mold to further avoid leakage of the plastic material and additionally includes evaporative cooling means thereon for maintaining the lid at a temperature below that of the mold at least during the initial casting operation to minimize the deposition of plastic on the inner surface of the lid.

Additional advantages and benefits of the present invention will become apparent upon a reading of the description of the preferred embodiments taken in conjunction with the accompanying drawings.

BRIEF DESCRIPTION OF THE DRAWINGS

FIG. 1 is a schematic plan view of a typical rotational casting apparatus of a type to which the mold assembly comprising the present invention is applicable;

FIG. 2 is a magnified vertical sectional view through the frame of the apparatus shown in FIG. 1, as viewed substantially along the line 2—2 thereof;

FIG. 3 is a vertical transverse sectional view through a mold assembly shown in FIG. 2 and taken substantially along the line 3—3 thereof;

FIG. 4 is a fragmentary plan view of the upper mounting flange of the mold shown in FIG. 3;

FIG. 5 is a fragmentary magnified transverse sectional view of a permanent magnet in the mold mounting flange shown in FIG. 4, and taken substantially along the line 5—5 thereof;

FIG. 6 is a magnified vertical longitudinal sectional view through the mold lid and vent assembly shown in FIG. 3, and taken substantially along the line 6—6 thereof;

FIG. 7 is a fragmentary vertical sectional view illustrating an alternative embodiment of the present invention; and FIG. 8 is a vertical longitudinal sectional view of a permanent magnet on the mold lid shown in FIG. 7, and taken substantially along the line 8—8 thereof.

DESCRIPTION OF THE PREFERRED EMBODIMENTS

Referring now in detail to the drawings, and as schematically shown in FIG. 1, a typical rotational casting apparatus to which the present invention is applicable is indicated by the numeral 10 in the drawings. In the exemplary embodiment of the machine illustrated, three radially extending arms 12 are provided which are connected to a central hub 14, which is intermittently driven to index each of the arms through an arcuate increment of about 120°. A mold carrying frame 16 is affixed to the end portion of each of the arms 12, on which one or a plurality of rotational casting mold assemblies 18 are mounted. In accordance with this arrangement, the arms and the mold assemblies mounted on each of the frames thereof are intermittently indexed from a load-unload position, as indicated at 20 in FIG. 1, in a clockwise direction into a curing oven 22; thereafter, into a cooling chamber 24; and finally, back to the load-unload station 20, at which the parts are removed from the loads and the molds are recharged with new plastic material.

The curing oven 22 preferably is of a hot-air circulating type incorporating a furnace 26 and attendant duct work 28 for circulating hot air over the frame and mold assemblies mounted thereon, which are disposed within the oven and which are rotated in a plurality of planes, effecting a progressive buildup of the flowable plastic on the inner surfaces of the mold cavity. The particular temperatures employed in the curing oven are dependent upon the specific type and formulation of flowable plastic material which is being cast. Conventionally, the temperature of the oven is maintained at a level substantially in excess of the optimum temperature to which the plastic itself is heated in order to facilitate a raised heat transfer to the interior of the mold, thereby shortening the casting cycle. The specific temperature to which the interior mold surface and the plastic in contact therewith is heated will generally range from as low as about 150° F. for some plastics and as high as 550° F. for other plastics. The minimum temperature is dictated by that temperature at which an incipient fusion or curing of the flowable resin occurs, while the maximum temperature level is controlled below that at which a thermal degradation of the plastic occurs or which is conducive toward adversely affecting the physical and/or chemical characteristics of the hollow plastic articles produced. For liquid vinyl plastisols, as an example, mold temperatures ranging from approximately 300° F. to about 400° F. are normally employed for most formulations to effect a gelling and subsequent fusion thereof.

The rotational casting mold and method comprising the present invention are applicable to a variety of plastics which possess flowable characteristics either by virtue of being in a finely particulated free flowing states, or alternatively, in a liquid form. Typical plastics suitable for this purpose include: acetals, acrylonitrile-butadiene-styrene, acrylics, butyrates, epoxy resins, ethylene-vinyl-acetates, polyamides, polycarbonates, polyethylenes, polypropylenes, polyurethanes, polyvinyl chloride in both liquid and powdered form, propionates, rigid vinyl polymers and copolymers, styrene polymers and copolymers, etc.

At the completion of a prescribed period in the curing oven, the mold supporting arms 12 are indexed through an increment of 120° wherein the mold assembly is advanced from the curing oven into the cooling chamber 24, in which the molds are rapidly cooled, such as by a water spray introduced through a header 30 mounted in the cooling chamber, which connects to a plurality of nozzles 32 for directing a water spray into the interior of the cooling chamber and against the mold assemblies. At the conclusion of the cooling cycle, an indexing of the mold support arms again occurs wherein the frame 16 and the cooled molds thereon are indexed from the cooling chamber to the load-unload station 20, at which the hollow finished plastic articles are removed from the molds and the molds are recharged with a premeasured quantity of fresh plastic material. The specific indexing duration of the mold supporting arms is dictated by the necessary dwell period of the molds in the curing oven to achieve a satisfactory curing of the resin being employed in accordance with the practice well known in the art.

In order to achieve a distribution of the flowable plastic material in the form of a substantially uniform coating on the inner surface of the mold cavity, the frames 16 and the mold assemblies thereon are simultaneously rotated about a plurality of axes when the supporting arm is disposed within the curing oven. The simultaneous rotation of the frames and the molds mounted thereon through a plurality of planes can be achieved as in the exemplary machine illustrated by a coaxial shaft drive consisting of an inner solid shaft around which a tubular shaft extends and to which reference is made to U.S. Pat. No. 2,957,202 for further details of the machine. Suffice it to say for the purposes of the present invention, that the frame 16 and the molds thereon are subjected to a compound rotation in a plurality of planes in which the molds are disposed in angular, upright, as well as inverted, positions in order to achieve a flow of the puddle of plastic within the mold cavity uniformly over the inner mold surface, effecting a progressive deposition thereof in the form of a coating of substantially uniform thickness. The rotation of the frame and molds is accomplished at a speed below that at which the plastic is thrown by centrifugal force against the inner mold cavity surfaces. A speed is employed at which the puddle of flowable plastic material remains in the lowermost region of the mold by the action of gravity and the mold itself is moved relative to the puddle such that during heating of the mold, a progressive gellation or adherence of the plastic occurs as evidenced by a progressive buildup of the coating of the inner mold surface.

It will be apparent from the foregoing that at least during the initial phases of the casting operation, the entire plastic charge is in a flowable condition and has a tendency during the rotation of the mold to leak from any openings existing between the mold proper and the closure member of the mold. This problem is particularly pronounced in connection with the rotational casting of liquid vinyl plastisols which initially are of a moderate viscosity but which undergo a reduction in viscosity during the initial heating thereof just prior to the initiation of the gelling action. It is during this period of reduced viscosity that the principal leakage of the plastisol occurs if an adequate sealing of the molds is not accomplished.

A description of the mold assembly comprising the present invention will now be made with particular reference to FIGS. 2–6 of the drawings. The mold assembly 18, as shown, consists of a three-dimensional enclosure or mold body 34, which is formed with a cavity 36 therein, the surface of which is provided with a suitable texture, if desired, consistent with the desired surface finish of a plastic hollow article to be made. The mold body 34 is formed with a neck section defining an opening 38 disposed in communication with the cavity 36, through which the plastic material is charged and through which the finished plastic article is removed from the mold. The neck portion of the mold is defined by the upstanding flanges 40, as best seen in FIG. 3.

The mold 34 may conveniently be produced by an electroforming operation in which a pattern of the exact configuration and size and having the appropriate surface texture is provided with an electro-conductive coating and is subsequently immersed in an electroplating bath, whereby a thick electroplating is deposited over the pattern. Conventionally, electro-formed molds of this type consist of a nickel plating layer disposed adjacent to the pattern surface, over which a copper or copper alloy plating is applied in a thickness sufficient to provide a mold body of the requisite strength to enable its use in a rotational casting operation. At the completion of the electro-forming operation, the pattern is collapsed and removed from the overlying plating deposit through the neck portion of the mold and suitable mounting brackets are brazed or welded to the exterior mold surface for removably mounting the mold on a suitable supporting frame.

A typical mold assembly is illustrated in FIG. 2 of the drawing, in which the mold 34 is supported at one end thereof by a bracket 42, which is rigidly secured to the frame 16 of the rotational casting apparatus. The opposite end of the mold 34 is formed with a supporting rod 44 which is slidably disposed in an aperture 46 formed in a mounting bracket 48 affixed to the frame 16, which enables relative movement of the mold with respect to the frame as the result of their different relative coefficients of expansion and contraction. It will be understood that alternative satisfactory securing means can be employed for removably mounting the mold on the frame of a rotational casting apparatus.

The mold assembly 18 comprising the present invention is further provided with a substantially rectangular open frame 50 consisting of bars of substantially rectangular cross section which are securely fastened such as by brazing or welding, indicated at 52 in FIG. 3, along the upper edges of the upstanding flanges 40 of the neck portion of the mold body. The rectangular frame 50 is further rigidified by means of reinforcing braces 54, which are secured to the periphery of the frame and are securely attached to the exterior of the mold body, as best seen in FIG. 3. In accordance with this arrangement, the rectangular frame 50 defines the opening 38 of the mold.

The opening 38, as defined by the inner surfaces of the rectangular frame 50, is removably closed by a closure member or lid 56, which is magnetically coupled and retained in position on the mold. In accordance with the embodiment as illustrated in FIGS. 3–5, the magnetic coupling of the lid 56 is achieved by a plurality of annular permanent magnet assemblies 58, which are embedded in and are disposed at spaced intervals along the closing mating surface of the rectangular frame. Each magnet assembly, as best seen in FIG. 5, includes a circular cylindrical magnet 60, which preferably is of an Alnico type 5, which retains its magnetism in spite of the elevated temperatures to which the mold assembly is subjected. The cylindrical side surface of the magnet 60 is enclosed within a sleeve of a nonmagnetic material, such as a brass sleeve 62. The inner end of the magnet 60 is disposed in abutting relationship against the inner surface of a cylindrical cup 64, which is composed of a magnetizable material, such as steel, for example.

Each of the magnet assemblies 58 are preferably oriented such that the exposed ends thereof are of a north polarity, while the inner end disposed against the base of the cylindrical cup 64 is of a south polarity, and whereby a magnetic annular field is formed along the mating face of the rectangular frame between the exposed outer edge of the cylindrical cup and the circular face of the magnet 60. The cylindrical cup 64 serves to conduct and concentrate the magnetic lines of force and is a necessary component of the magnet assembly in such instances where the frame 50 is composed of a nonferrous material. When the rectangular frame 50 is composed of steel, for example, the cylinder cup 64 can be omitted since the portion of the frame adjacent to the bore in which the magnet assembly is disposed will itself serve the function of the cylindrical cup.

The particular size and the spacing between magnet assemblies 58 are selected so as to provide a magnetic coupling between the rectangular frame and the lid to assure a retention of the lid in appropriate sealed relationship against the mating face of the frame in all rotated positions of the mold assembly and in further consideration of the weight of the plastic material disposed in the form of a puddle against the inner surface of the lid when the mold is inverted. The lid 56 is composed of a magnetizable material at least along those portions which are disposed in contact with the magnet assemblies embedded within the rectangular frame. Preferably, the lid is composed entirely of a flexible spring steel sheet having a thickness which may generally vary from 0.030 to 0.070 inch, which enables a flexure of the lid so as to conform with any surface irregularities in the rectangular frame, assuring the maintenance of an appropriate seal between. It is also preferred to provide the lid 56 with a suitable protective coating such as, for example, a chromium plating, providing a smooth surface which facilitates a stripping of the lid from any plastic material that may become adhered to the under surface thereof, as well as to prevent a corrosion of the lid during its passage through the several processing steps.

The use of a flexible resilient lid as opposed to a relatively rigid lid provides the further advantage in removing the lid from the mold at the completion of the processing cycle. For this purpose, at least one end of the lid, as shown in FIG. 2, is extended, as indicated at 66, projecting beyond the end of the rectangular frame 50, enabling a manual gripping thereof and an upward peeling of the lid as indicated in phantom, effecting a concurrent disengagement from the attraction of the magnetic assemblies embedded within the rectangular frame, as well as a peeling of any plastic that has become deposited on the underside of the lid disposed in communication with the opening of the mold.

It will be apparent from the arrangement as shown and as described, that the closing of the mold can be quickly and simply achieved by merely applying the lid in overlying relationship on the mating surface of the rectangular frame 50 and the lid is retained in appropriate sealed relationship thereon throughout the rotational casting cycle. In order to provide for an improved surface-to-surface contact between the rectangular frame and the lower lid surface, the mating surface, indicated in FIG. 5 at 68, of the frame can be ground after the magnetic assemblies 58 are embedded therein, assuring a substantially flat surface. It will also be understood that while the rectangular frame 50 is shown to have a mating surface 68 in a substantially flat plane, the contour of the frame can be altered consistent with the particular type of mold configuration and article being cast and can appropriately be closed by a suitable magnetically coupled lid.

In accordance with a further preferred embodiment of the present invention, the lid 56 is provided with a suitable venting aperture consisting of a tubular member 70, as best shown in FIG. 6, having a threaded shank portion 72 which extends through a suitable port in the lid and is securely fastened by means of a nut 74. The tubular member 70 is preferably provided with an axially extending tapered bore 76 therethrough for facilitating removal of any contaminating plastic material that may become lodged therein. The inner end portion of the tubular member is formed with an enlarged tapered end 78, which tends to minimize the flow of plastic along the inner periphery thereof and into the bore 76.

The length of the tubular member projecting inwardly of the underside of the lid, as shown in FIG. 3, is controlled such that the open end of the tapered bore is positioned at a distance beyond the depth at which the level of flowable plastic will accumulate during an inversion of the mold during the initial heating operation.

A typical charge of a flowable plastic material is indicated at 80 in FIG. 3. This plastic charge 80, during the heating cycle of the mold and during its simultaneous rotation about a plurality of planes, causes a progressive deposition on the inner mold cavity surface and becomes gelled or fused thereon forming an integral film, indicated in phantom at 82 in FIG. 3. The length of the tubular member 70 is accordingly selected to assure that the inwardly projecting end thereof at all times remains above the maximum depth of the puddle of the plastic material contained within the mold regardless of the angular position of the mold.

The provision of the venting device has been found to still further enhance the sealability of the mold by preventing the buildup of a pressure therein as occasioned by the evolution of any fumes liberated from the plastic during the heating thereof, as well as the pressure occasioned by the heating of air trapped within the mold cavity. In clamping fixtures of the types heretofore known, the absence of such a vent has contributed toward an appreciable leakage of the closure member due to the pressure buildup within the mold cavity tending to force the flowable plastic between the mating surfaces of the mold and closure.

In accordance with still another preferred embodiment of the present invention, the outer surface of the lid 56, as best seen in FIGS. 2, 3 and 6, is provided with a plurality of segments of an evaporative media 84, which are secured in heat conductive relationship on the lid surface. The evaporative media may comprise, for example, any suitable open cellular plastic material or fibrous material which is resistant to the temperatures to which the mold assembly is subjected in the curing oven. Evaporative media 84 composed of a porous fiberglass mat which is adhered on the exterior surface of the lid assembly has been found particularly suitable for this purpose.

The provision of the evaporative media 84 serves to effect an evaporative cooling of the lid to a temperature below that of the mold body 34 during the initial heating of the mold assembly in the curing oven whereby the deposition of the plastic on the inner lid surface is inhibited. It will be apparent from the arrangement as illustrated in FIG. 3 that the plastic material disposed within the neck portion of the mold, as well as on the inner lid surface, must be trimmed from the final article. All such trim material constitutes scrap and a wastage of the initial plastic charge. By virtue of the evaporative cooling achieved on the lid surface, the resultant differential temperature of the lid relative to the mold cavity results in an appreciable reduction in the quantity of plastic deposited on the inner lid surface constituting a saving of material and further enhancing the economy of the operation.

As will be noted in FIGS. 2, 3 and 6, the evaporative media 84 is preferably applied to the exterior lid surface in the form of individual segments so as not to appreciably detract from the flexibility of resilience of the lid. In such instances, where the evaporative media is of itself a resilient material, it can be applied in the form of a continuous sheet. The cooling of the lid is achieved by the well-known evaporative cooling effect resulting from the removal of heat from the lid by conduction to the evaporative media for effecting a vaporization of water entrapped within the porous evaporative media. In the specific apparatus as illustrated in FIG. 1, a replenishment of the water in the evaporative media is achieved during the spray cooling of the mold assemblies while disposed in the cooling chamber 24. This water remains entrapped in the evaporative media during the subsequent unloading and reloading cycle and is operative during the initial phase of the heating cycle in the curing oven to maintain the lid at a temperature below that of the mold body. While all of the water contained within the evaporative media may be vaporized during the complete curing cycle, the maintenance of a cooling differential between the lid and the mold proper at least during the initial heating phase, results in a substantially complete deposition of the flowable plastic material in the form of a gelled layer on the inner mold surface and once the plastic has become immobile, no further deposition thereof can occur on the under lid surface.

An alternative construction of the mold closure assembly is illustrated in FIGS. 7 and 8, in which magnet assemblies 86 are mounted on the lid 88 instead of being embedded within the rectangular frame 50, as previously described in connection with FIGS. 2–6. In the embodiment as illustrated in FIGS. 7 and 8, a rectangular frame 90 is similarly secured to the upstanding flanges defining the neck portion of a mold 92 defining an opening 94 through which the plastic material is charged and the finished article is removed. The rectangular frame 90 is of a suitable magnetizable material such that a magnetic coupling occurs between the magnet assemblies 86 on the lid 88 and the frame. The magnet assemblies in all other respects are identical to the magnet assemblies 58, as previously described.

While it will be apparent that the invention disclosed herein is well calculated to fulfill the objects above stated, it will be appreciated that the invention is susceptible to modification, variation and change without departing from the proper scope of fair meaning of the subjoined claims.

What is claimed is:

1. An apparatus for rotationally casting hollow plastic articles comprising a framework, means for rotating said framework simultaneously through a plurality of planes, at least one mold mounted on said framework, said mold comprising a three-dimensional hollow enclosure defining a mold cavity having a surface corresponding to the exterior surface of an article to be cast, said mold formed with an opening disposed in communication with said mold cavity for charging plastic into and for removing a cast article from said mold, a frame on said mold defining said opening and formed with a mating surface, a lid at least coextensive with and adapted to overlie said opening in sealing engagement with said mating surface on said frame, said lid comprised of a heat conductive material and provided with an evaporative media in heat transfer relationship with the exterior surface thereof for cooling said lid below the temperature of said enclosure during at least the initial portion of a casting operation, and magnetic means for magnetically coupling said lid to said mold in removable sealing relationship with said mating surface.

2. An apparatus for rotationally casting hollow plastic articles comprising a framework, means for rotating said framework simultaneously through a plurality of planes, at least one mold mounted on said framework, said mold comprising a three-dimensional hollow enclosure defining a mold cavity having a surface corresponding to the exterior surface of an article to be cast, said mold formed with an opening disposed in communication with said mold cavity for charging plastic into and for removing a cast article from said mold, a frame on said mold defining said opening and formed with a mating surface, a lid comprised of a resilient magnetizable sheet of a size at least coextensive with and adapted to overlie said opening in sealing engagement with said mating surface on said frame, and magnetic means mounted on said enclosure adjacent to said mating surface for magnetically coupling said lid to said mold in removable sealing relationship with said mating surface.

3. The mold as defined in claim 2, wherein said lid is provided with venting means disposed in communication with the atmosphere and said cavity and projecting inwardly into said enclosure a distance beyond that of a charge of plastic in said cavity.

4. The mold as defined in claim 2, wherein said magnetic means are permanent magnets mounted on said lid and said frame is of a magnetizable material.

5. The mold as defined in claim 2, wherein said magnetic means comprises a plurality of individual permanent magnets extending in spaced relationship along said mating surface.

References Cited

UNITED STATES PATENTS

| | | | |
|---|---|---|---|
| 1,751,869 | 3/1930 | Mayne | 18—Magnet Digest |
| 1,759,058 | 5/1930 | Miller | 18—Magnet Digest |
| 2,065,943 | 12/1936 | Lerch et al. | 11—Magnet Digest |
| 2,740,159 | 4/1956 | Berg | 18—26 |
| 2,908,039 | 10/1959 | Amos | 18—26 |
| 2,923,032 | 2/1960 | Miller et al. | 18—39 |
| 2,957,202 | 10/1960 | Rekettye | 18—26 |
| 3,192,568 | 7/1965 | Nicholls | 18—39 |
| 3,350,745 | 11/1967 | Schott et al. | 18—26 |

FOREIGN PATENTS

| | | | |
|---|---|---|---|
| 904,041 | 8/1962 | Great Britain | 220—55(Magnet) |
| 994,124 | 6/1965 | Great Britain | 18—(Magnet Digest) |

CHARLES W. LANHAM, Primary Examiner

J. E. ROETHEL, Assistant Examiner

U.S. Cl. X.R.

249—121